United States Patent
Moinard

(10) Patent No.: US 11,623,606 B2
(45) Date of Patent: Apr. 11, 2023

(54) DEVICE FOR REMOVABLY MOUNTING AN AIRBAG MODULE

(71) Applicant: Autoliv Development AB, Vargarda (SE)

(72) Inventor: Fabrice Moinard, Vouzailles (FR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/275,474

(22) PCT Filed: Sep. 12, 2019

(86) PCT No.: PCT/EP2019/074306
§ 371 (c)(1),
(2) Date: Mar. 11, 2021

(87) PCT Pub. No.: WO2020/053323
PCT Pub. Date: Mar. 19, 2020

(65) Prior Publication Data
US 2021/0284097 A1    Sep. 16, 2021

(30) Foreign Application Priority Data

Sep. 14, 2018 (FR) ..................................... 1858319

(51) Int. Cl.
*B60R 21/203* (2006.01)
*B60R 21/38* (2011.01)

(52) U.S. Cl.
CPC ............ *B60R 21/38* (2013.01); *B60R 21/203* (2013.01)

(58) Field of Classification Search
CPC .............. B60R 21/203; B60R 21/2035; B60R 21/2037
See application file for complete search history.

(56) References Cited

U.S. PATENT DOCUMENTS

| 6,276,711 | B1 | 8/2001 | Kurz et al. |
| 7,621,364 | B2 | 11/2009 | Haglund |
| 10,384,637 | B2 | 8/2019 | Inuzuka |
| 2003/0173759 | A1 | 9/2003 | Grenier |
| 2005/0023804 | A1* | 2/2005 | Hauer ................. B60R 21/2035 280/728.3 |
| 2007/0210563 | A1* | 9/2007 | Vazquez ............. B60R 21/2035 280/728.2 |
| 2015/0183693 | A1 | 7/2015 | Aoyama |

(Continued)

FOREIGN PATENT DOCUMENTS

| CN | 211869488 U | * 11/2020 | |
| DE | 20311760 U1 | 12/2003 | |
| DE | 102013013352 A1 | * 4/2014 | ......... B60R 21/2035 |

(Continued)

*Primary Examiner* — Barry Gooden, Jr.
(74) *Attorney, Agent, or Firm* — Foley & Lardner LLP

(57) ABSTRACT

The invention relates to a motor vehicle steering wheel comprising a device for removably mounting an airbag module on the steering wheel, the mounting device comprising at least two hooks linked to either the airbag module or the steering wheel, first portions extending into the interaction zones to form the means for holding the hooks guiding elements forming two distinct removal paths for guiding a removal tool, the steering wheel comprising a single removal opening for insertion of the removal tool along the two removal paths.

14 Claims, 2 Drawing Sheets

(56) References Cited

U.S. PATENT DOCUMENTS

Figure 1:
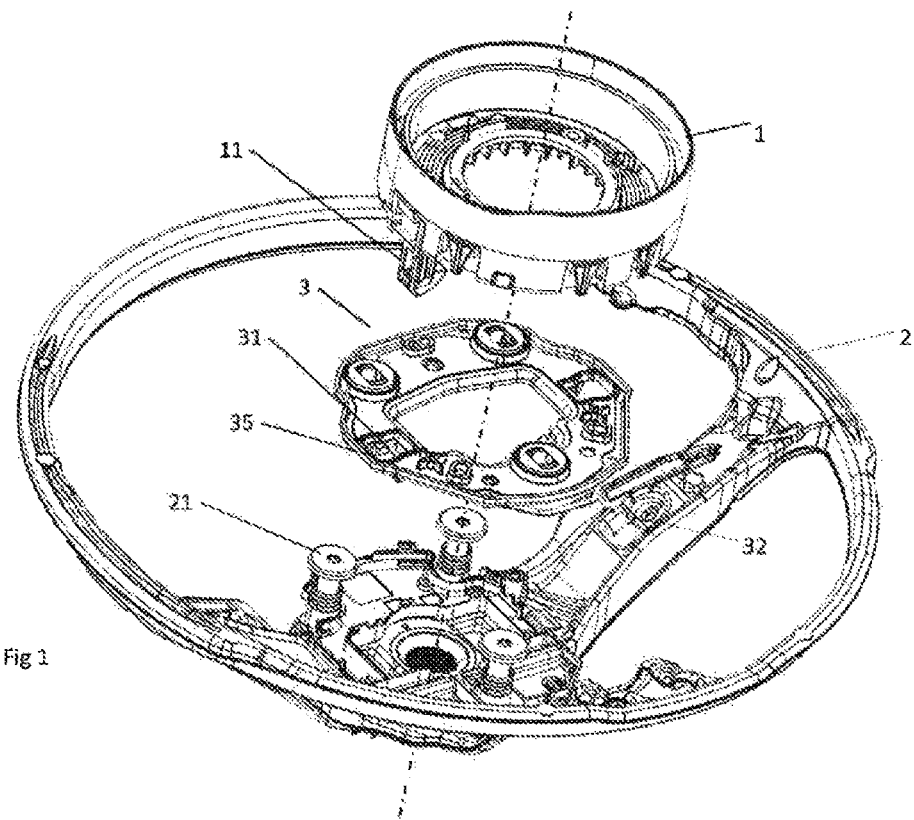

2020/0001816 A1* 1/2020 Ducardonnet ...... B60R 21/2035
2020/0139915 A1* 5/2020 Funk ..................... B60R 21/203

FOREIGN PATENT DOCUMENTS

| EP | 1491412 A1 | * | 12/2004 | ............. B60R 21/05 |
| JP | 2000033850 A |  | 2/2000 |  |
| WO | 2008/026423 A1 |  | 3/2008 |  |

* cited by examiner

DEVICE FOR REMOVABLY MOUNTING AN AIRBAG MODULE

The present invention generally relates to a device for removably mounting an airbag module on a steering wheel, and in particular Document US2003173759 describes an arrangement of for removably mounting an airbag module on a steering wheel. The arrangement comprises a mounting plate which defines openings to receive the feet of an airbag unit. The plate is provided with a spring which extends through the openings to provide a snap-on fastening. When a pushing force is exerted on a determined point of the spring, said spring is displaced in a predetermined manner and the portions of the spring are guided such that they no longer pass through the corresponding openings, thus making it possible to release the module. The pushing force for unlocking the spring is applied to a small zone of the spring, which may lead to incorrect handling during the unlocking operation.

One aim of the present invention is to respond to the disadvantages of the prior art mentioned above and in particular to propose a removable mounting device for which the force required to unlock the airbag module is lesser and the removal of which is facilitated.

To this end, a first aspect of the invention relates to a motor vehicle steering wheel comprising a device for removably mounting an airbag module on the steering wheel, the mounting device comprising at least two hooks linked to either the airbag module or the steering wheel, the hooks cooperating with insertion means (35) located on the other of the airbag module or the steering wheel and an elastic retainer (30) to form means for holding the hooks on the other of the airbag module or the steering wheel in zones of interaction with the hooks, the elastic retainer being held in position by locking means on the other of the airbag module or the steering wheel, the elastic retainer comprising first portions extending into the interaction zones to form the means for holding the hooks, second portions located between the first portions of the elastic retainer, the removable mounting device further comprising guiding elements, the guiding elements forming two distinct removal paths for guiding a tool for removing the device for removably mounting the airbag module, characterized in that the steering wheel comprises a single removal opening for insertion of the removal tool along the two removal paths, the opening and the guiding elements being arranged such that the displacement of the removal tool through the opening along each of the two removal paths and on the second portions causes the displacement of the first portions of the elastic retainer out of the zones of interaction with the hooks in order to release the hooks from the other of the airbag module or the steering wheel during the displacement of the removal tool.

It is also understood that the axis of rotation of the steering wheel is the axis about which the steering wheel can turn to steer a vehicle on which it is mounted. The insertion means may be in the form of one or more holes, openings, grooves or recesses for example. The guide means may be in the form of one or more pins, notches, grooves or ribs for example. Using the single opening makes it possible in particular to simplify the removal operations, to simplify the architecture of the steering wheel, and to limit the impact of the mounting device on the style of the steering wheel.

According to another variant embodiment, the guiding elements and the second portions of the elastic retainer form the two removal paths. The assembly is therefore more compact, since parts of the retainer also participate in the guiding; the retainer thus combines several functions.

According to another variant embodiment, the two distinct removal paths are rectilinear and the removal tool is displaced along the removal paths to release the hooks from the other of the airbag module or the steering wheel. In other words, the removal tool is displaced in translation, typically by exerting a pushing force, to displace and/or deform the first portions of the elastic retainer and release the hooks.

According to another variant embodiment, the removal tool is displaced in a rotational movement of the removal tool relative to the other of the airbag module or the steering wheel to release the hooks from the other of the airbag module or the steering wheel.

According to another variant embodiment, the hooks are linked to the airbag module.

According to another variant embodiment, the hooks are linked to the airbag module, the mounting device further comprising a mounting plate designed to be mounted on the frame of the steering wheel, the mounting plate comprising a plurality of openings forming the insertion means, each opening being suitable for receiving a hook, the locking means of the elastic retainer being formed on the mounting plate or the steering wheel.

The mounting plate makes it possible in particular to facilitate the assembly operations. Indeed, the elastic retainer can be pre-assembled on the mounting plate before the latter is mounted on the steering wheel. Additionally, this embodiment makes it possible to insert a part of the horn system between the plate and the frame of the steering wheel.

According to another variant embodiment, the guiding elements are formed protruding on the mounting plate.

According to another variant embodiment, the two removal paths form a V, the tip of which is directed toward the outside of the other of the airbag module or the steering wheel.

According to another variant embodiment, the two removal paths have trajectories which intersect at a point S, the single removal opening being located at the point S.

According to another variant embodiment, the mounting device comprises studs for guiding the elastic retainer, in the vicinity of the elastic retainer, between the second portion and each first portion of the elastic retainer, such that the displacement of the tool on the removal paths causes a rotation of a first portion out of the interaction zone. Such a positioning of a guide stud blocking a direction of displacement of the elastic retainer means that a pushing force applied by the removal tool (inserted through the single removal opening) on a second portion leads to bending of the retainer and rotation of a first part.

According to another variant embodiment, the elastic retainer is open, the first portions being located at the free ends of the elastic retainer.

According to another variant embodiment, the locking means prevent the movement of the elastic retainer (30) in a direction substantially perpendicular to the plane containing the elastic retainer.

According to another variant embodiment, the locking means comprise at least first hooks arranged in the vicinity of the insertion means.

According to another variant embodiment, the steering wheel comprises a blocking element which forms an obstacle to prevent the removal tool from touching a zone of the second parts of the elastic retainer, the blocking element being positioned between the two removal paths. This makes it possible to prevent insertion of the removal tool in the wrong direction, which could damage the nearby components.

A second aspect of the invention relates to a method for removing an airbag module mounted on a motor vehicle steering wheel comprising a device for removably mounting the airbag module according to the first aspect of the invention, characterized in that it comprises a first step of introducing a removal tool through the single removal opening, a step of displacing the removal tool along one of the two removal paths until it is on one of the second portions of the elastic retainer, a step of displacing said second portion by the removal tool to cause the displacement of one of the first portions of the elastic retainer out of the zone of interaction with the corresponding hook a second step of introducing a removal tool through the single removal opening the tool, a step of displacing the removal tool along the other of the two removal paths until it is on another of the second portions of the elastic retainer, a step of displacing said other second portion to cause the displacement of one of the other first portions of the elastic retainer out of the zone of interaction with the corresponding hook.

Figure 2:
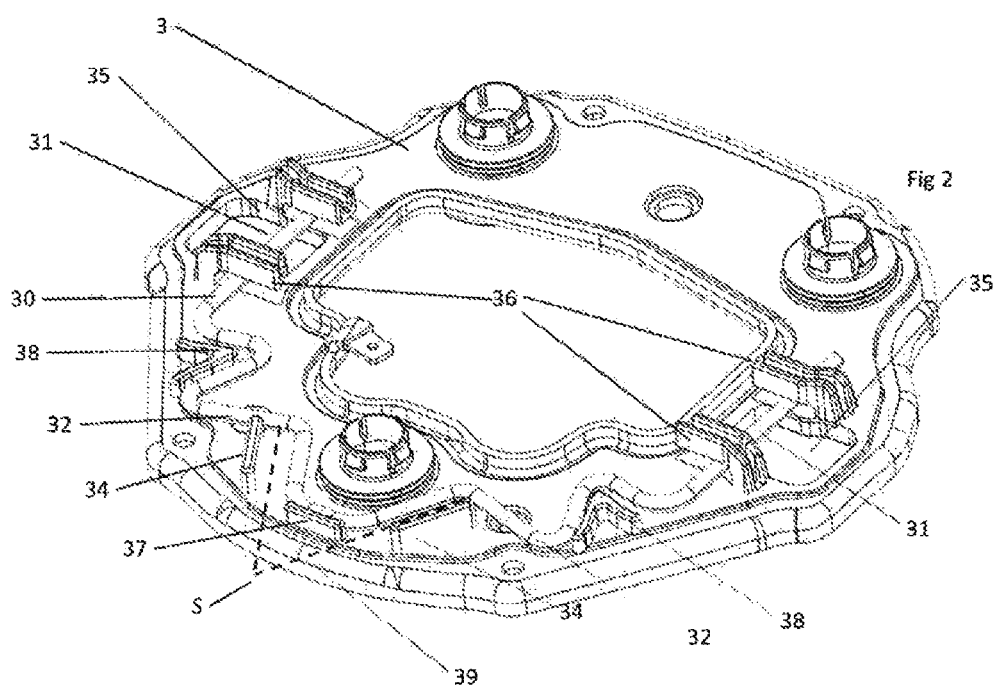
Figure 3:
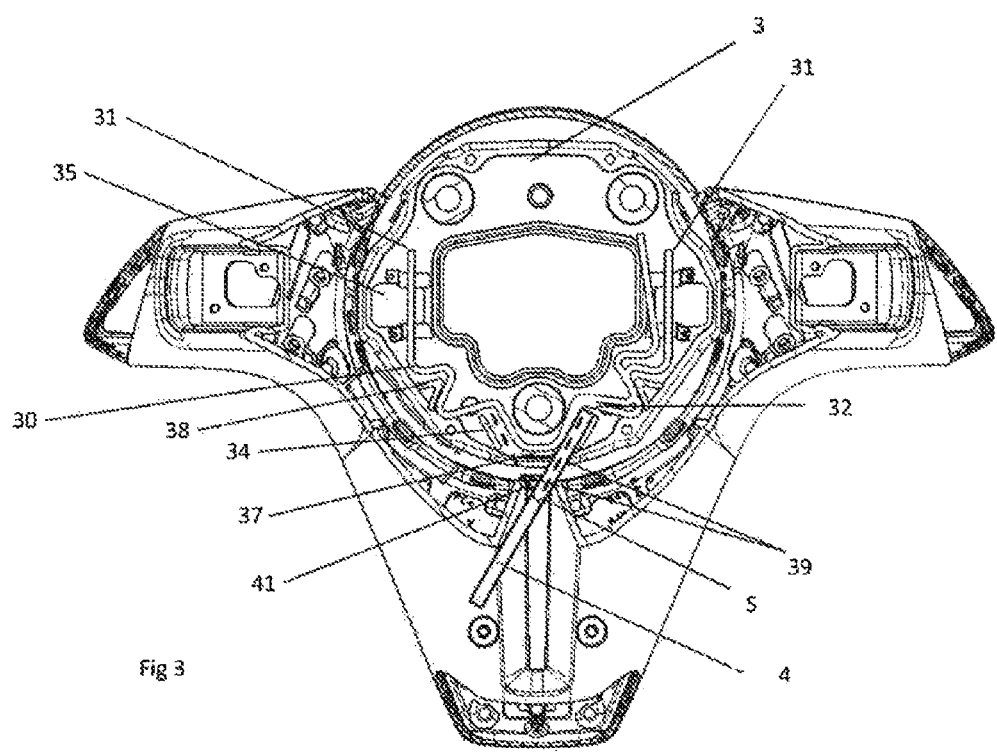

Other features and advantages of the present invention will be more clearly apparent on reading the following detailed description of an embodiment of the invention, given by way of non-limiting example and illustrated by the appended drawings, which show:

FIG. 1, a first exploded view of a steering wheel fitted with the device for removably mounting an airbag module;

FIG. 2, a view from below a part of the device for removably mounting an airbag module, in the locking position;

FIG. 3, a view from below a part of the device for removably mounting an airbag module, in the unlocking position;

The motor vehicle steering wheel and the removable mounting device according to the invention will now be described with reference to FIGS. 1 to 3.

Hereinafter, axis of rotation A of the steering wheel 2 will be used to denote the axis about which the rotation of the steering wheel causes the wheels of the vehicle to be steered using a mechanical, electrical and/or hydraulic transmission mechanism (not shown).

As is known per se, an airbag 1 module 1 is mounted on the steering wheel 2 via a mounting plate 3. The mounting plate 3 is fastened to the steering wheel 2 via screws 21. The airbag module 1 is mounted on the mounted plate 3 by clipping. The mounting plate comprises a plurality of openings or orifices 35 through which hooks 11 of the airbag module 1 are introduced. The module 1 is clipped onto the mounting plate 3 by an elastic retainer 30 which interacts with the hooks 11 in an interaction zone at the openings 35. According to the variant embodiment shown, the elastic retainer 30 is mounted on the mounting plate 3; nonetheless, it is possible to conceive of variant embodiments in which the elastic retainer 30 is mounted on or integral with the frame 2 of the steering wheel and/or the airbag module 1. Likewise, the mounting system may be conceived of without the mounting plate 3.

As shown in FIG. 2, the elastic retainer 30 comprises first portions 31 which extend through the openings 35 in the mounting plate 3. When the airbag module 1 is mounted on the mounting plate 3, the first portions 31 of the elastic retainer 30 are engaged in the hooks 11 of the airbag module 1 such that it is no longer possible to withdraw the hooks 11 without disengaging the first portions 31 of the elastic retainer 30. This assembly ensures the airbag module 1 is held on the steering wheel 2, inter alia when the airbag is deployed.

According to the invention, the elastic retainer 30 comprises a second portion 32 located between the first portions 31 and guide means 34 of a removal tool. In the embodiment presented, the guide means 34 form, together with the elastic retainer, two distinct removal paths 39 for guiding a tool for removing the device for removably mounting the airbag module. During the removal, the removal tool is introduced through an opening 41 present on the steering wheel and is guided by the guide means 34 along the two removal paths.

According to the invention, the steering wheel comprises a single opening. Thus, during the removal of the airbag module, the removal tool is introduced a first time through the opening of the steering wheel and follows the first removal path, and a second time through the same opening and follows the other removal path.

The removal tool is displaced along the two removal paths formed by the guide means 34 until it reaches the second portions 32 of the elastic retainer 30. The removal tool then causes the displacement of the first portions 31 of the elastic retainer 30 out of the zone of interaction with the hooks 11 by acting on the second portions 32 of the elastic retainer. The action applied successively by the removal tool on each second portion 32 of the elastic retainer to successively displace each first portion is either a pushing, a pulling, a pivoting or a combination of these three movements.

According to a variant embodiment, the two removal paths are also formed by the second portions 32 of the elastic retainer 30. The two removal paths have for example rectilinear trajectories. According to the variant embodiment shown, the two paths have trajectories which intersect for example in the form of a V. The tip of the V corresponds substantially to the position of the introduction opening of the steering wheel.

This introduction opening of the steering wheel is placed on the outer part of the steering wheel so as to be accessible from the outside for a user using the removal tool.

The mounting device may comprise a blocking element 37 in order to protect the second portions 32 of the elastic retainer when the removal tool is introduced through the opening. The blocking element comprises for example a wall 37 placed between the two removal paths. This wall 37 also makes it possible to lock the movement of the elastic retainer 30 in the direction of introduction of the removal tool 4.

According to the variant embodiment shown, the elastic retainer 30 is open, the first portions then forming the free ends of the elastic retainer 30. The use of an open elastic retainer 30 makes it possible to reduce the force to be exerted on the second portion 32 to cause the displacement of the first portions 31.

The removal device can also comprise at least one guide stud 38 arranged in the vicinity of the elastic retainer 30. According to one embodiment, each guide stud 38 is positioned between the first and second portions 31, 32. The guide studs 38 provide the positioning of the elastic retainer 30 on the plate during the force applied by the removal tool for inducing the rotational movement of the first portion 31 of the elastic retainer.

According to the variant embodiment shown in the figures, the guide studs 38 and/or the blocking element 37 and/or the guide means 34 and the pivot studs 33 and/or the guide studs 34 are formed on the mounting plate 3.

Nonetheless, according to other variant embodiments, the guide means may be formed on the frame 2 of the steering wheel and/or on the airbag module 1. In this embodiment, the mounting plate 3 is not necessary, sine the openings 35 are formed in the central part of the steering wheel or the airbag module.

The elastic retainer 30 and/or the first and second portions of the elastic retainer 30 are held on the mounting plate 3 by locking means 36. These locking means 36 ensure the elastic retainer is held in a plane substantially parallel to the mounting plate 3, while keeping it free to be displaced within this plane. In other words, the elastic retainer 30 or the first and second portions 31, 32 of the elastic retainer 30 cannot be displaced in a direction perpendicular to the mounting plate 3.

According to the variant embodiment shown, the locking means 36 are in the form of L-shaped hooks originating from the mounting plate 3. First hooks 36 are arranged on either side of the openings 35. These first hooks ensure the correct positioning of the first portions 31 of the elastic retainer 30 during the operation for mounting the airbag module. These first hooks 36 also ensure the guiding of first portions 31 during the unlocking.

According to another variant embodiment, the locking means 36 may originate from the frame 2 of the steering wheel and/or on the airbag module 1. In this embodiment, the mounting plate 3 is not necessary, sine the openings 35 are formed in the central part of the steering wheel or the airbag module.

FIG. 3 shows the mounting device according to the invention in an intermediate unlocking position in which just one of the two first portions is displaced out of the zone of interaction with the hooks. The removal tool 4 is introduced through the opening along the removal path on the right in FIG. 3. Pushing the removal tool toward the top of the figure and/or rotating it in the anti-clockwise direction of the figure causes rotation of the first portion 31.

In order to completely unlock the module, all that is required is to repeat the operation on the left-hand side, introducing the removal tool 4 through the single removal opening 41 of the steering wheel, for example at the intersection point S of the removal paths.

It will be understood that various modifications and/or improvements obvious to those skilled in the art can be made to the different embodiments of the invention described in the present description, without going beyond the scope of the invention as defined by the appended claims.

The invention claimed is:

1. A motor vehicle steering wheel comprising an assembly device for removably mounting an airbag module on the steering wheel,
the assembly device comprising at least two hooks connected to one of either the airbag module or the steering wheel, the at least two hooks cooperating with insertion elements located on the other of either the airbag module or the steering wheel and an elastic retainer to form elements for holding the at least two hooks on the other of either the airbag module or the steering wheel in interaction areas with the at least two hooks,
the elastic retainer being held in position by locking elements on the other of either the airbag module or the steering wheel, the elastic retainer comprising:
first portions extending in the interaction areas to form the elements for holding the at least two hooks,
second portions located between the first portions of the elastic retainer,
the assembly device further comprising guide elements, the guide elements and the second portions forming two separate straight dismantling paths to guide a tool for dismantling the assembly device of the steering wheel, wherein
the steering wheel comprises a single dismantling opening for inserting the dismantling tool along the two dismantling paths, and wherein
the opening, the second portions, and the guide elements are arranged so that a movement of the dismantling tool through the opening along each of the two dismantling paths and on the second portions causes movement of the first portions of the elastic retainer out of the interaction areas with the at least two hooks to release the at least two hooks from the other of either the airbag module or the steering wheel during the movement of the dismantling tool.

2. The motor vehicle steering wheel according to claim 1, characterized in that the guide elements and the second portions of the elastic retainer form the two dismantling paths.

3. The motor vehicle steering wheel according to claim 1, characterized in that the two separate dismantling paths are rectilinear and the dismantling tool moves along the dismantling paths to release the hooks from the other of either the airbag module or the steering wheel.

4. The motor vehicle steering wheel according to claim 1, characterized in that the dismantling tool moves according to a rotational movement of the dismantling tool relative to the other of either the airbag module or the steering wheel in order to release the at least two hooks from the other of either the air bag module or the steering wheel.

5. The motor vehicle steering wheel according to claim 1, characterized in that the at least two hooks are connected to the airbag module.

6. The motor vehicle steering wheel according to claim 1, characterized in that the at least two hooks are connected to the airbag module, the mounting device further comprising a mounting plate designed to be mounted on an armature of the steering wheel,
the mounting plate comprising a plurality of openings forming the insertion elements, each of the openings being adapted to receive a hook, the locking elements of the elastic retainer being formed on the mounting plate or the steering wheel.

7. The motor vehicle steering wheel according to claim 6, characterized in that the guide elements are formed projecting from the mounting plate.

8. The motor vehicle steering wheel according to claim 1, characterized in that the two dismantling paths form a V, a tip thereof is directed towards the outside of the other of either the airbag module or the steering wheel.

9. The motor vehicle steering wheel according to claim 8, wherein the elastic retainer is planar.

10. The motor vehicle steering wheel according to claim 1, characterized in that the assembly device comprises blocks for guiding the elastic retainer, in the vicinity of the elastic retainer, between the second portion and each first portion of the elastic retainer, so that the movement of the tool on the dismantling paths generates a rotation of a first portion outside the interaction area.

11. The motor vehicle steering wheel according to claim 1, characterized in that the elastic retainer is open, the first portions being located at the free ends of the elastic retainer.

12. The motor vehicle steering wheel according to claim 1, characterized in that the locking elements prevent the movement of the elastic retainer in a direction substantially perpendicular to the plane containing the elastic retainer.

13. The motor vehicle steering wheel according to claim 1, characterized in that the locking elements comprise at least first hooks arranged in a vicinity of the insertion elements.

14. The motor vehicle steering wheel according to claim 1, characterized in that it comprises an obstruction element forming an obstacle to prevent the dismantling tool from touching an area of the second parts of the elastic retainer, the obstruction element being positioned between the two dismantling paths.

* * * * *